United States Patent [19]

Reed et al.

[11] 4,286,008

[45] Aug. 25, 1981

[54] DRY RELEASE TRANSFERS

[75] Inventors: Kenneth J. Reed, London; Alan L. Lythgoe, Hythe, both of England

[73] Assignee: E. T. Marler Limited, Wimbledon, England

[21] Appl. No.: 926,077

[22] Filed: Jul. 19, 1978

[30] Foreign Application Priority Data

Jul. 20, 1977 [GB] United Kingdom ............... 30430/77

[51] Int. Cl.[3] .......................... B32B 3/00; B32B 27/14

[52] U.S. Cl. .................................... 428/195; 427/146; 427/147; 428/207; 428/335; 428/336; 428/913; 428/914; 430/253; 430/256; 430/281; 430/326

[58] Field of Search ............... 428/913, 914, 198, 195; 427/146, 147; 96/28, 35.1; 430/256, 281, 291, 253, 271

[56] References Cited

U.S. PATENT DOCUMENTS

| | | | |
|---|---|---|---|
| 3,639,123 | 2/1972 | Gray | 156/234 X |
| 3,759,809 | 9/1973 | Carlick et al. | 427/44 X |
| 3,888,672 | 6/1975 | Lee | 96/28 X |
| 4,022,926 | 5/1977 | Keough et al. | 427/43 X |
| 4,029,505 | 6/1977 | Nebe | 96/28 X |
| 4,041,204 | 8/1977 | Hepher et al. | 96/28 X |

FOREIGN PATENT DOCUMENTS

| | | |
|---|---|---|
| 959670 | 6/1964 | United Kingdom . |
| 1491678 | 11/1977 | United Kingdom . |
| 1521766 | 8/1978 | United Kingdom . |

*Primary Examiner*—Thomas J. Herbert, Jr.
*Attorney, Agent, or Firm*—William E. Jackson

[57] ABSTRACT

A dry release transfer is disclosed in which the design layer is formed by printing one or more inks onto a carrier sheet, at least one of the inks being a photopolymerizable composition, and subjecting the design layer to ultra-violet radiation or an electron beam discharge in order to polymerize the photopolymerizable ink. By suitable selection of polymerizable components of the ink so that the photopolymerized ink has a high Young's modulus, a stress-resisting design layer is produced which will release readily from the carrier on mechanically stressing the carrier, e.g. by rubbing lightly with a ball-point pen.

21 Claims, 4 Drawing Figures

Fig. 2.
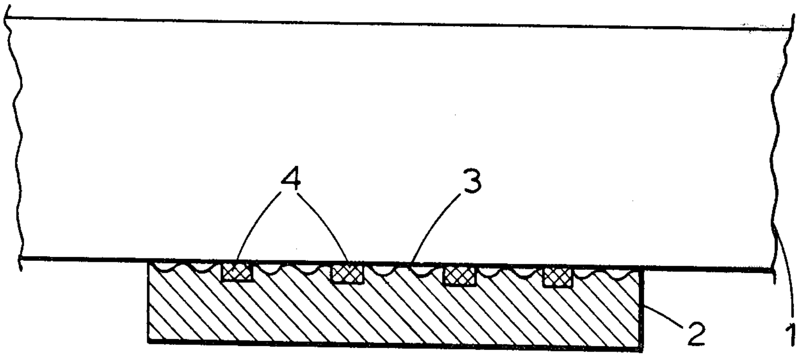
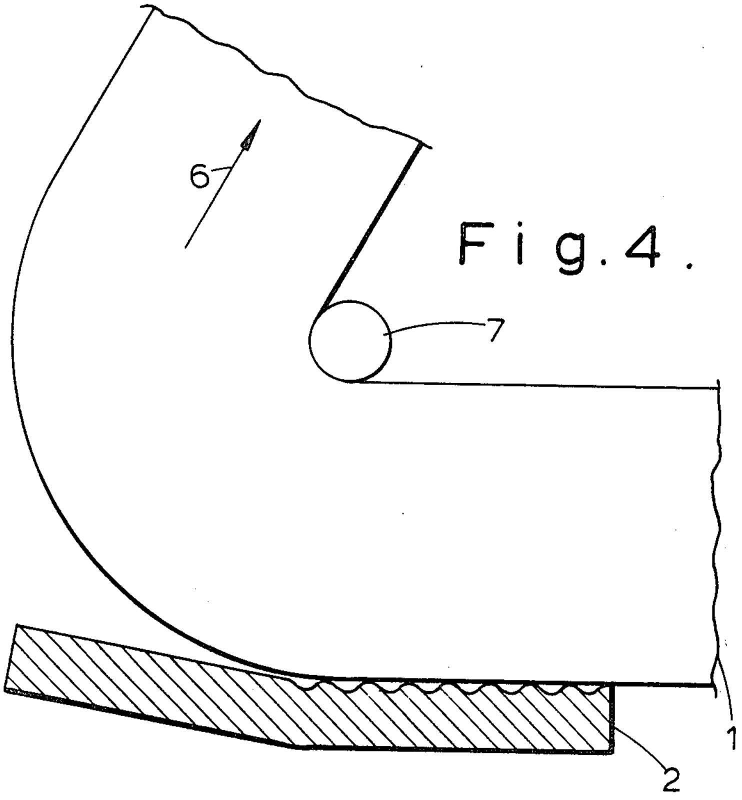
Fig. 4.

DRY RELEASE TRANSFERS

FIELD OF THE INVENTION

This invention relates to dry release transfers and to a method of producing such transfers.

DESCRIPTION OF THE PRIOR ART

Dry release transfers comprise a carrier sheet (alternatively termed a support sheet) with one or more designs printed on one surface of the carrier sheet so that a selected design can be physically transferred as a dry ink layer to receiving substrate and adhered thereto by an adhesive. Such transfers are termed "dry release" because the release of the designs from the carrier sheet does not require the application of a liquid.

Dry transfers are usually produced with a pressure sensitive adhesive so that on application of pressure to the back surface of the carrier sheet over the design while placed in contact with a receiving substrate the design adheres to the substrate so that the carrier sheet can be peeled away to leave the design transferred and adhered to the substrate.

Two types of such dry transfers having different transfers mechanisms have been previously described in the art in British patents Nos. 959,670 and 1,491,678 and both of these rely on the use of a low-tack sensitive adhesive in which the adhesive may overlap the design to avoid the difficulty of printing an adhesive layer in exact register with the design. This adhesive has higher adhesion to the carrier sheet than the receiving substrate so that when the carrier sheet is peeled away the adhesive outside the design area is retained on the carrier sheet and the adhesive tears or shears around the edges of the design to permit physical transfer of the design.

Strong forces are exerted on the design layer during transfer and these are increased when an overlapping adhesive is used. These forces frequently cause the design to break so that only a part transfers and alternatively the design transfers in a distorted form often with visible cracks.

British Patent No. 1,491,678 describes a method of reducing the edge adhesion of the design and weakening the adhesive layer strength at the design edges and this somewhat reduces the risk of breaking the design during transfer.

However the design layers of such prior transfers have all been produced by screenprinting a solvent-based screen ink based on cellulose nitrate as the film forming polymer and the concentration of the polymer in the formulae given for these inks is very low, e.g. 22–27% by weight. Since this polymer is the only film-forming component of the inks, the result of this is to give a dry ink film after evaporation of the solvents which is extremely thin, generally 5 micrometers, and only about 60% of this is polymer. This polymer thickness is totally inadequate to produce a transfer which is essentially unbreakable under normal transfer conditions and in fact, even in skilled hands, transfers frequently break during transfer.

The applied transfers have very poor scratch or abrasion resistance and this has greatly restricted their field of application; for example, they are unsuitable for marking or decoration of equipment and components, packaging applications and numerous outdoor uses.

Moreover, cellulose nitrate is an extremely inflammable polymer and the transfers are hazardous when used for childrens toys and games, home decor, and skin transfers.

If a coarse screen mesh is used having less than 90 meshes per centimeter and having a higher open area percentage in order to increase ink thickness, print quality becomes worse and ink drying time increased and this increases the size of the drying plant which is costly and already occupies about 75% of the area of the printing plant.

A further problem exists in these dry transfers in that print quality and geometrical accuracy are already inadequate due to imperfect print edges and line width variations which are partly caused by the normal screen-printing mesh of 90 mesh per centimeter and also by evaporation of the ink solvent during printing causing partial clogging of the screen mesh apertures.

If a finer mesh is used to improve print quality, the dry film thickness falls below 5 micrometers and has a totally inadequate film strength and mesh clogging becomes worse.

Print quality can be numerically expressed by the maximum number of lines per millimeter which are resolved in the print having lines and spaces of equal width. Generally dry transfer materials have a resolution of only up to 5 lines per millimeter.

In addition, all the transfer mechanisms hitherto known do not give adequate control of transfer properties and frequently lead to failure to transfer or accidental or unwanted transfer.

SUMMARY OF THE INVENTION

All of these problems of prior art transfers are overcome in accordance with the invention by a dry release transfer comprising a carrier sheet and a design layer carried by said carrier sheet and releasably adhered thereto, said design comprising a photopolymerised ink layer whereby the application of an external force to the carrier sheet or to the design layer causes a reduction or breaking of the adhesion of the design to the carrier sheet so that the design layer can be physically transfered to a receiving substrate.

The term "design" includes all manner of pictures, decorations, pictorial games and toys, education, uniform colour areas, advertising, markings and typographical characters such as alphabets of various lettering styles and sizes, numerals, symbols such as electronic, architectural, chemical engineering and mathematical symbols, various textures, titles, logos and text matter all of which may be single-coloured or multicoloured.

The term design layer includes all those layers which are physically released from the carrier sheet by the application of external force to the carrier sheet and includes a single colour design layer, multiple colour layers, clear layer and adhesive layer is present, all of which are released as a single composite layer. Examples of single colour design layer plus adhesive layer are transfer sheets used for small designs such as sheets of letters or numerals. When the colour design is large or complex or is multicolor produced by halftone printing, a clear or coloured overall layer is printed to extend over the whole of the colour design components so that these physically co-release together and can be transferred in one piece in their printed spatial relationship.

In this specification "photopolymerised" means polymerised by actinic radiation or by electron beam discharge. Actinic radiation includes ultra-violet and visible radiation, as well as other electromagnetic radiation capable of activating polymerisation. Ultra-violet radiation requires the presence of photoinitiators in the photopolymerisable ink but electron beam radiation does not.

DETAILED DESCRIPTION OF THE INVENTION

The photopolymerised layer should not be brittle and a minimum elongation at breakpoint should be 0.5% and preferably in the range of 2–15% depending on the design size and shape and the flatness of the receiving substrate.

It has been found that reduction or physical breaking of the adhesive bonding between the carrier sheet and the photopolymerised design layer is dependent on the chemical properties of the carrier sheet and design layer, the stress-transmitting properties of the carrier sheet and stress-resisting properties of the design layer and on any pre-stressing of the design layer. All of these properties are readily controlled in the invention so that physical release or transfer of the design can be accurately and reliably predetermined by selection of carrier sheet and design layer materials.

The carrier sheet and design layer inks are selected so that no chemical reaction occurs between these to form strong and irreversible bonds. For example, there should be not strong solvent action of the design layer inks on the carrier sheet. There should also be no covalent chemical bonding between the carrier sheet and the design layer produced by co-polymerisation during photopolymerisation of the liquid inks. Only weak physico-chemical bonds should exist between carrier sheet and the design layer in contact with it.

It has been found that to break these physico-chemical bonds during transfer, the photopolymerised design layer should have stress-resisting properties so that when an external force is applied to the carrier sheet this is resisted by the design layer and this stresses the adhesive bond causing failure and physical release of the design layer. Two factors determine the stress resisting properties of the design layer; its thickness and its stiffness and the latter is conveniently expressed by Young's modulus. Stress-resisting properties are approximately proportional to the cube of layer thickness and directly proportional to Young's modulus.

Stress-transmitting properties of the carrier sheet should be such that the carrier sheet thickness and Young's modulus should not be too high otherwise the material will be so stiff that external forces will not be transmitted to the adhesive bonds between design and carrier and should not be too low and compliant so that again no stress will be transmitted to the adhesive bond.

Generally plastic films and cellulosic based sheets and combinations thereof in the thickness range of 20–150 micrometers have the required mechanical properties when used with an appropriate stress-resisting photopolymerisable layer. A suitable combination must be determined by simple experiment in which the external force is applied and physical release or transfer properties are assessed.

The practice of the invention allows a photopolymerised layer to be selected which will provide the correct release and transfer properties and the two basic parameters are layer thickness and Young's modulus. Layer thickness is readily controlled by the printing process and the number of ink layers that are applied and Young'modulus can be controlled by the crosslink density of the photopolymerised layer.

The inherent flexibility of the molecules which form the photopolymerised layer also affect layer stress-resisting properties and elongation properties but with given materials having adequate elongation, crosslink density determines very precisely the stress-resisting properties.

In one embodiment of the invention, physical release of the design layer occurs to such an extent that it is clearly visible as lightening of the colour of the design due to an air film entering between transferable layer and carrier sheet. This is an important aid to reliable transfer which ensures that release is complete and guarantees freedom from fracture of the design. Such visible release is termed herein 'pre-release' since it can be produced without adhesive assistance for example without adhesive layer if present in the assembly being in contact with the receiving substrate.

In a further embodiment of the invention, release of the design layer during transfer is assisted by pre-stressing of the adhesive bonds between design layer and carrier sheet. Such pre-stressing may be chemical or physical in nature. Physical pre-stressing is carried out for example by the shrinkage of the design layer during photopolymerisation. Suitable shrinkage can range from 0.5%–12% and is partly dependent on crosslink density, the higher the crosslinking density, the higher the shrinkage. Shrinkage is resisted by the carrier sheet so the net effect is to place the adhesive bonds in a state of strain so that the application of only a small external force is required to physically release the design layer. Physical pre-stressing can occur to such an extent that spontaneous release occurs on photopolymerisation and therefore the composition of the photopolymerisable ink is selected to produce a degree of pre-stressing which is less than this.

Chemical pre-stressing is carried out by the action of an adhesive layer on a photopolymerised design layer whereby a solvent or other liquid in the adhesive layer causes the design layer to swell. Since lateral swelling is resisted by the carrier sheet this again places the adhesive bonds in a state of strain and bond strength is usually permanently reduced so that even after evaporation of volatile liquid the design layer has reduced adhesion to the carrier sheet.

By control of pre-stressing and of the stress-resisting properties of the design layer, transfer sheets can be prepared with accurately pre-determined release characteristics and in which release is produced by a small external force which is desirable for easy and fast transfer properties.

A further advantage of the photopolymerised design layers of the invention is that photopolymerisable inks are free from volatile materials or contain only a minor proportion of these so that screen mesh clogging caused by evaporation on the printing screen cannot occur and very high and consistent print quality is obtained and this is unaffected by temperature variations in the printing environment.

Ultra fine screeprinting meshes may be used without mesh clogging and meshes as fine as 220 meshes per centimeter using monofilament polyamide and 180 meshes per centimeter using monofilament polyester can be used and print resolution of 12 lines per millimeter can be obtained.

Much higher values of dry ink layer thickness are therefore readily obtained because there is a little or no loss of volatile materials when the liquid ink is photopolymerised and a design layer thickness in the range of 8–50 micrometers thickness is obtained by selecting the appropriate screen mesh. For single layer designs such as lettering numerals and symbol sheets for graphic artists and designers a layer thickness of 10–12 micrometers is preferred.

Any means may be used to attach the design layer to the receiving substrate including, mechanical fixing, electrostatic, magnetic, air pressure, suction and adhesives. Adhesives include:

no-tack, low-tack and high-tack pressure sensitive,
heat-fix, solvent-fix and water-fix,
liquid polymerising adhesives,
self-seal adhesives,
photopolymerising pressure sensitive adhesives,
adhesive receiving substrates,
delayed tack heat-fix adhesives,
encapsulated adhesives, and these may be printed in register with the design layer, or overlap the design layer and shear during transfer according to known mechanisms. Adhesives of the kind described in British Patent Specification No. 1,491,678 may be employed.

Because of the improved release characteristics of photopolymerised inks compared with prior art transfer inks, much wider variety of carrier sheets may be used in the invention. These comprise plastic films and cellulosic sheets and combinations of these. Plastic films include polyethylene, polypropylene, polystyrene, polystyrenebutadiene, polyvinyl chloride, copolymers of vinylchloride and vinylacetate, polyesters and cellulose acetate. Such plastics may have a further coated layer giving better release properties. Cellulosic materials include glassine, greaseproof and vegetable parchment papers in which the porosity of the cellulosic material has been reduced or eliminated.

The application of this invention to the manufacture of dry release transfers having special releasable layers to further control the release of the design layer is described in copending British patent application No. 06068/78 (Kenneth James Reed).

Cellulosic sheets may be coated, laminated or impregnated with a plastic film or polymer such as polyethylene extrusion coated paper, polypropylene laminated paper and amino-formaldehyde polymer impregnated paper. Release coatings may also be applied to the carrier sheet surface such as silicones and Werner chromium complexes.

Light transmitting carrier sheets are generally preferred to assist in positioning the transfer on the receiving substrate.

Photopolymerisable design layers are applied by all printing, painting and coating processes which employ liquid inks such as screen, litho, letter-press, gravure, flexo, brush, spray, roller and the like. When the application method applies a layer which is too thin for stress-resisting properties, multiple layers are applied with intermediate exposure to photopolymerising radiation to build up the correct layer thickness.

The external force that release the design layer may consist of any mechanical means. For example, the strokes of a ball-pen, pencil or stylus applied with a force of from e.g. 50–500 grams, or a bending, twisting or stretching force applied to the carrier sheet. Alternatively the design layer can be transferred by a direct tensile pull or a peeling force applied for example by adhering the design layer to a receiving substrate and then peeling-off the carrier sheet.

In a multilayer transfer of the invention at least one of the layers is produced by photopolymerisation. Other layers may be produced with either photopolymerisable inks or by conventional inks which are dried by the appropriate method. Non-photopolymerisable layers may be applied before or after the photopolymerisable layer. For example a clear overall photopolymerisable layer may be applied to the carrier sheet by screenprinting and after photopolymerisation a coloured design layer is applied by printing with conventional evaporation drying solvent-based inks or oxidation drying inks overprinted onto the clear layer by screen or litho printing respectively.

Alternatively a design layer or layers in conventional inks may be applied first to the carrier sheet and after drying are then overprinted with a clear or coloured overall stress-resisting photopolymerisable layer which when photo-polymerised can be physically released and transferred and carries with it all the design components in their original printed spatial relationship. This procedure is very convenient when the design is a four colour halftone picture or consists of much fine-line detail.

Photopolymerisation is produced by brief exposure of ethylenically unsaturated materials to actinic radiation such as ultra violet radiation or a mixture of ultra violet and visible radiation or accelerated electron beam radiation. Ultra violet radiation of high intensity is conveniently produced by medium pressure mercury vapour discharge lamps operated at 80 watts per centimeter or more in fused silica or quartz tubes. Other useful sources of intense ultra violet light are xenon discharge lamps and xenon flash lamps and swirl flow plasma radiation arcs.

Crosslink density is mainly determined by the number of photopolymerisable ethylenically unsaturated groups per molecule of the materials used in the liquid ink, termed functionality. One ethylenic group per molecule cannot crosslink and gives a soft and very extensible layer with inadequate Young's modulus. Two ethylenic groups per molecule generally gives a suitable value and three ethylenic groups gives high values which may lead to spontaneous release. A mixture of materials with one, two and three ethylenic groups is a useful means of achieving crosslink density which will then be an average value. The mono-ethylenic material can be compared to a plasticiser in conventional inks, the di-ethylenic material provides the main component and the tri-ethylenic material is added to increase the stress-resisting properties to precisely the desired value.

Elongation properties are achieved by using flexible chemical groups in the photopolymerisable materials such as polyalkyl, polyether and polyester groups, combined with control of the crosslink density.

Another important advantage of photopolymerisation in operation of the invention is that very fast ink "drying" is obtained. It is very desirable to use fast photo-polymerising materials in order to reduce the exposure time to the actinic radiation since the radiation frequently has an infra-red component which causes heating of the carrier sheet and can cause distortion or shrinkage with excessive exposure.

Very fast photopolymerising inks are obtained by photoinitiated vinyl addition polymerisation of monomers and prepolymers containing terminal or pendant acryloyl or methacryloyl groups: $CH_2{=}CR{-}CO{-}$ where R is H or $CH_3$-respectively. The acryloyl group is faster polymerising than the methacryloyl group and reference below to acryloyl groups includes methacryloyl groups.

To obtain excellent printability the liquid ink must possess correct viscosity and tack values and these can be readily achieved together with all the other requirements described above by controlling the molecular weight and composition of the photopolymerisable materials. Conveniently a material of high viscosity is used in admixture with a liquid of lower viscosity.

Low viscosity and liquid photopolymerisable materials are monomers, that is materials which do not contain polymeric groups in the molecule and suitable materials are acrylate esters of mono, di, tri and tetrahydric alcohols. Monomers are preferred which have very low volatility and low skin and eye irritancy and these properties are generally obtained with monomers of higher molecular weight. Acrylate esters of the following alcohols are suitable and are given by way of example:

Monohydric alcohols: 2 phenoxyethanol, 2 phenoxyethoxyethanol and hydrogenated derivatives, Dihydric alcohols: tripropylene glycol, bisphenol A, hydrogenated bisphenol A and hydroxyethyl ethers and hydroxypolyethoxyethers of bisphenol A and hydrogenated bisphenol A.

Trihydric alcohols: trimethylolpropane tetrahydric alcohols: pentaerythritol

Polyhydric alcohols: dipentaerythritol

All hydroxyl groups may be esterfied or one or more groups may be left unesterfied to provide materials with controlled hydrophilic-lyophilic balance for offset litho inks. Free hydroxyl groups may be further reacted or partially reacted with isocyanates to produce urethanes.

High viscosity is readily obtained by photopolymerisable prepolymers in which there is a polymeric component in the molecule. These materials range from highly viscous liquids to solids and have molecular weight range of about 250-5000. The terminal or pendant acryloyl groups can be incorporated in polymeric components such as a polyurethane, polyepoxide, polyether, polyester and polyaminoformaldehyde polymers.

Preferably 2-6 acryloyl groups are incorporated in the polymer molecule and this can be carried out for example by reacting acrylic acid or acryloyl chloride with a polymer or polymerisable material containing free hydroxyl groups. Alternatively such groups can be incorporated by reaction of a hydroxy alkly acrylate with a polymer or polymerisable material containing isocyanate, epoxide, carboxylic acid, anhydride or aminoformaldehyde groups.

For example an acrylated epoxy prepolymer is prepared by reacting bisphenol A polyglycidyl ether and terminal epoxide groups with acrylic acid which open the oxirane ring and the hydroxyl groups so produced can be further reacted with acryloyl chloride to introduce additional acryloyl groups.

Acrylated urethane prepolymers are prepared for example by reacting hydroxypropyl acrylate with hexamethylene di-isocyanate or polyisocyanates. Alternatively, acryloyl polyether urethanes and acryloyl polyester urethanes are prepared by reacting an excess of a di- or polyisocyanate with a polyether or polyester having free hydroxyl groups and then reacting this polymer with a hydroxylalkyl acrylate.

To obtain the correct balance of properties more than one monomer and more than one prepolymer may be used in the inks. One or more photoinitiators are dissolved or dispersed in the unsaturated materials at a concentration of 0.01-30% and more usually 1-10% based on the weight of unsaturated material to photoinitiate polymerisation when using ultra violet radiation or ultra violet plus visible radition. Photoinitiators are not required when high energy accelerated electron beam radiation is used. The following are examples of photoinitiators:

Ketones and derivatives such as benzophenone, 4,4'dimethyl-aminobenzophenone, acetophenone, 2,2 diethoxy-acetophone, halogenated benzophenone, benzil, benzil di-methylacetal. Acrylions and derivatives such as benzoin, benzil dimethylacetate and benzoin isopropyl ether. Thio compounds such as thioxanthone, 2 chlorothioxanthone, benzoyl diphenyl sulphide, polynuclear quinones and derivatives such as benzoquinone, chloroanthraquinone. Chlorinated hydrocarbons such as hexachlorethane and diazo compounds including fluoroborate salt of diazonium compounds.

The effect of photoinitiators may be accelerated by a tertiary amine such as ethyl dimethylaminobenzoate or an amino acrylate polymer.

Other types of unsaturated monomers and polymers can be added to the main photopolymerisable materials listed above to participate in the photopolymerisation such as N-vinylpyrrolidone, vinyl acetate, allyl and cinnamyl esters, acrylamide derivatives such as (N-isobutoxymethyl) acrylamide, triallylcyanurate. Unsaturated polyesters include maleate, fumarate, itaconate and citraconate esters of glycols.

Non-reactive polymers can also be dissolved or dispersed in the main photopolymerisable materials such as a high acid value polyester to give alkali solubility to the photopolymerised transferable layer, or dispersed finely powdered polyvinylchloride or vinyl chloride-acetate copolymer which solvate during photopolymerisation to increase film strength and flexibility.

Finally, various other additives may be added to the inks such as pigments, fillers, flow agents, waxes which are well known to persons skilled in the art of printing inks.

Photopolymerisation can be subject to inhibition by atmospheric oxygen which effects mainly the outer surface of the design layer. This can lead to a reduction in film strength with thin design layers and oxygen inhibition is prevented in the invention by very high intensity focussed radiation using an elliptical reflector and by the use of poly-acryloyl unsaturated materials plus the most efficient photoinitiators and accelerators. If necessary photopolymerisation may also be carried out in a nitrogen atmosphere or by placing a transparent plastic film over the liquid ink during exposure, both of which reduce access by atmospheric oxygen.

Most carrier sheets readily transmit long wavelength ultra violet radiation such as 365 nm and polyethylene carrier sheets readily transmit also the shorter wavelengths of 254 and 310 nm. Consequently photopolymerisation can be carried out by reverse exposure that is by passing the radiation through the carrier sheet. This has the advantage that the most highly polymerised layer will then be adjacent to the release layer where the effect of a high Young's modulus is most pronounced. When using inks with a high optical density such as a black ink with a density of 2.0 or more it is useful to use both reverse and direct exposure simultaneously or successively.

In an alternative embodiment of the invention, oxygen inhibition of the transferrable layer is deliberately arranged by selection of suitable acryloyl unsaturated materials, photoinitiators and control of radiation intensity to reduce the rate of photoinitiation to cause adhesiveness and tackiness in the outer surface of the photopolymerised transferable layer by formation of soft or tacky low molecular weight polymer species. By this means an extra adhesive layer is avoided and of course this 'self-adhesive' surface is in perfect register with the transferable layer.

Such surface adhesiveness is particularly easily achieved by reverse exposure that is by passing radiation through the carrier sheet rather than by the normal direct exposure. The adhesiveness of a self-adhesive layer is increased when the outer surface is produced so as to have a high gloss since this increases the contact area to receiving substrates.

Such self-adhesive transfers are particularly useful where an easily removable adhesive bond is required such as letter and symbol sheets for graphic artists and for home decor of walls and furniture.

Photopolymerised ink layers when pre-released from the carrier sheet can be of sufficient stiffness to be handled and used like a piece of plastic film or label. The transfer can be transferred to a substrate and moved about on its surface into an exact position and later the transfer can be adhered or removed and reused if required.

The control of viscosity and tack of the liquid photopolymerisable inks can also be carried out by applying the inks at elevated temperature or by the addition of a minor proportion, for example less than 20% volatile organic solvent. When such solvent is used it should have a low evaporation rate of less than 5 and preferably less than 1 with reference to n-butyl acetate as 100 as determined on the Shell Thin Film Evaporometer at 90% evaporation point. This avoids screen clogging in screenprinting with very fine screen meshes.

Transfer lettering and symbol sheets used by graphic artists and designers requires a black photopolymerisable ink which has a high optical density for example 2.0 or higher. Slow photopolymerisation is usually exhibited by such black inks and reverse and direct exposure to radiation is advantageously used simultaneously or successively to cause adequate photopolymerisation of the ink film, particularly at the carrier sheet interface.

The most efficient photoinitiators and accelerators are required which include benzil dimethyl ketal, and an intimate mixture of benzophenone and 4.4'-dimethylamino-benzophenone, prepared by melting the constituents together, cooling and grinding, and thioxanthone derivatives such as methyl- or chlorothioxanthone. A tertiary amine is included such as 4-N-dimethylamino ethylbenzoate and all these photoinitiators can also be used in admixture.

Carbon black pigments cause a particularly low rate of photopolymerisation and this can be overcome by replacing all or part of carbon black with black metal oxide such as iron oxide, very finely divided metal powders such as aluminium powder and a mixture of coloured pigments which do not substantially reduce the rate of photopolymerisation such as ultramarine blue pigment and yellow and magenta pigments which have good transmission of the photopolymerising radiation.

Photopolymerised dry transfers of the invention can be used for decoration and marking of ceramics, vitreous enamels, glass and similar substrates by incorporation of frits, powdered glazes and inorganic pigments in the photopolymerisable ink medium and after printing, photopolymerisation and application of a pressure sensitive or other adhesive, the design layer is transferred to the substrate which is fired to burn away the organic constituents and fuse the frits, glazes and pigments onto or into the substrate.

Anatase and rutile titanium dioxide pigments also reduce the rate of photopolymerisation when used in high concentration and all or part of these are replaced by zinc sulphide, barium sulphate, lithopone or antimony oxide pigments. Photoinitiators effective in white inks include benzil dimethyl ketal and homologues, and benzoyl derivatives of diphenyl sulphide, dimethylanthraquinone, chlorinated ketones and thioxanthone derivatives in low concentration to avoid yellowing.

The effect of pigments on rate of photopolymerisation is most pronounced when these absorb the actinic radiation such as ultra violet radiation. When accelerated electron beam radiation is used the effect of pigments is minimal.

The following Examples, in which parts are by weight, are given to illustrate the invention and the manner in which it may be carried into effect:

EXAMPLE 1

The following black photopolymerisable screen ink was printed through a plain weave monofilament polyamide mesh having 180 meshes per centimeter and a filament diameter of 30 micrometers, using an indirect photostencil:

| Ingredients | Parts |
|---|---|
| 1. Urethane acrylate prepolymer | 36 |
| 2. 2-Phenoxyethyl acrylate | 9 |
| 3. Tripropylene glycol diacrylate | 15 |
| 4. Trimethylolpropane triacrylate | 8 |
| 5. Benzophenone | 4 |
| 6. 4,4'-dimethylaminobenzophenone | 5 |
| 7. Benzildimethyl ketal | 3.85 |
| 8. Black iron oxide | 10 |
| 9. Ultramarine Blue | 14 |
| | 100 |

Item 1 is a highly viscous prepolymer having an average of three aceyloyl groups per molecule and is prepared from hexamethylene di-isocyanate, and a linear aliphatic polyester with free hydroxyl groups and hydroxypropylacrylate as described. This prepolymer is dissolved in monomers 2 and 3, and monomer 4 is added to the finished ink progressively until the required level of release properties are obtained. Items 5, 6 and 7 are photo-initiators and Items 8 and 9 give a blue-toned black print.

A design was printed consisting of alphabets of lettering plus a revolving power chart and printing carried out on blown high density polyethylene film which as translucent with a semi-gloss finish and a thickness of 100 micrometers. Photopolymerisation was carried out by exposure to two tubular medium pressure mercury vapour lamps at 80 watts per centimeter and housed in elliptical polished aluminium reflectors and the printed sheets were conveyed through the focussed radiation at 30 meters per minute.

Excellent print quality was obtained with a resolving power of 10 line pairs per millimeter and the design layer is physically released by applying strokes of a ball-pen or similar stylus with a force of 100 grams as shown by lightening of colour. The design layer had a thickness of 12 micrometers, elongation at breakpoint of 4–5% and good optical density.

EXAMPLE 2

A black photopolymerisable ink has the following composition and was prepared by dispersion on a triple roll mill:

| Ingredients | Parts |
|---|---|
| 1. Urethane acrylate prepolymer | 40 |
| 2. Di-acrylate ester of di-hydroxy-ethyl ether of bisphenol A | 36 |
| 3. Monoacrylate ester of mono-hydroxyethyl ether of bisphenol A | 8 |
| 4. Carbon black | 3.8 |
| 5. Benzil dimetheyl ketal | 4 |
| 6. Benzophenone | 5.7 |
| 7. Methylthioxanthone | 0.5 |
| 8. 4-Dimethylaminoethylbenzoate | 2 |
| | 100 |

This was screenprinted through a 140 mesh per centimeter monofilament polyester mesh onto an extruded film of polystyrene-butadiene of 120 micrometers thickness and photopolymerised as in Example 1 to give a high optical density black print with a thickness of 16 micrometers which is physically released by light stylus action. The liquid ink is based on monomers 2 and 3 of high molecular weight having extremely low volatility and very low skin irritancy and are essentially non-toxic.

EXAMPLE 3

A white photopolymerisable screen ink has the following composition and was prepared by dispersion on a triple roll mill:

| Ingredients | Parts |
|---|---|
| Urethane acrylate prepolymer | 35 |
| 2-Phenoxyethyl acrylate | 9 |
| Tripropylene glycol diacrylate | 16 |
| Benzophenone | 4 |
| Benzildimethylketal | 4 |
| Anatase titanium dioxide | 15 |
| Lithopone | 17 |
| | 100 |

This was printed as in Example 2 and photopolymerised as in Example 1 to give a design layer which is readily physically released by light stylus action.

EXAMPLE 4

The following low-tack pressure sensitive adhesive was screenprinted using 120 mesh per centimeter screen on any of the photopolymerised inks of Examples 1–3 so as to overlap the inks on the adjacent carrier sheet:

| Ingredients | Parts |
|---|---|
| Polyvinyl isobutyl ether | 10 |
| Polyvinyl ethyl ether high m. wt | 3 |
| Polyvinyl octadecyl ether | 2 |
| Aerogel silica 10–12 millimicron | 5 |
| Ethylene glycol mono isopropyl ether | 10 |
| Aliphatic hydrocarbon solvent | 70 |
| | 100 |

After drying for 25 seconds on a conveyorised drier having air jets impinging on the sheet at a temperature of 60° C., the dry sheets were cooled and interleaved with silicone coated release paper.

The ink design could be readily transferred to various receiving surfaces such as paper, plastic, glass, metal etc., by placing the adhesive surface of the design in contact with the receiving surface and applying strokes of a stylus to the carrier sheet over the design.

Release of the design was clearly visible by lightening of colour and the carrier sheet could then be peeled away to leave the design transferred and adhered to the receiving substrate and the overlap part of the adhesive remained on the carrier sheet by shear of the adhesive around the design edges.

EXAMPLE 5

The carrier sheet of Example 2, having a semi-matt extruded finish was printed at 4000 sheets per hour on a 4-colour offset litho press using the following four photopolymerisable process inks. The inks were photopolymerised at the delivery of the press by exposure to ultra violet radiation from two medium pressure mercury vapour lamps:

| Yellow | |
|---|---|
| Ingredients | Parts |
| Colour Index Pigment Yellow 13 | 15 |
| Acrylated epoxy prepolymer | 20 |
| Pentaerythritol triacrylate phenyl carbamate | 60 |
| Benzil dimethyl acetal | 3.5 |
| 2,2-Diethoxyaceophenone | 1.5 |
| | 100 |

The yellow pigment is dispersed in the mixture of the ethylenically unsaturated material on a triple roll mill and the photoinitiators are added as a dispersion in the remainder of the material in subdued light.

Magneta

This was prepared in the same way as the yellow ink but replacing the yellow pigment with 18 parts of Colour Index Pigment Red 57.

Cyan

This was prepared in the same way as the yellow ink except that the yellow pigment was replaced with 16 parts of Colour Index Pigment Blue 15.

Black

This was prepared in the same way as the yellow ink except that the yellow pigment was replaced with 18 parts of carbon black and 1 part of Colour Index Pigment Blue 15.

The inks were printed in the above sequence and tack-graded by addition of a small quantity of trimethylol propane tri-acrylate and photopolymerised as in Example 1.

The colour designs were overprinted by screenprinting using a 77 mesh per centimeter screen with the following clear photopolymerisable screen ink to overlap all the colour (printing) and which was cured by exposure at 30 meters per minute to ultra violet radiation from two tubular medium pressure mercury vapour lamps operated at 80 watts per centimeter to give a cross-linked layer of high Young's modulus and a thickness of 25 micrometers:

| Clear Ink | |
|---|---|
| Ingredients | Parts |
| 1. Acrylated urethane prepolymer | 52 |
| 2. 2-Phenoxyethyl acrylate | 26 |
| 3. Tripropylene glycol diacrylate | 15 |
| 4. Benzophenone | 4 |
| 5. Benzil dimethylacetal | 3 |
| | 100 |

The low molecular weight monomers (2 and 3) can be replaced by the high molecular weight monomers (2 and 3) of Example 2.

Stylus action caused physical release of the clear photopolymerised layer which carried with it the entire litho printed colour design.

Various adhesives were overprinted on the clear photopolymerised layer including a high-tack pressure sensitive adhesive based on crepe rubber tackified with resin ester gum, a spirit-fix adhesive based on an oil modified polyamide resin and a heat-fix adhesive based on polyvinyl acetate.

EXAMPLE 6

The transfer sheets of Example 5 with photopolymerised 4-colour half-tone litho printing and photopolymerised overall clear screen printed layer but without adhesive were overprinted with the white photopolymerisable screen ink of Example 3 which was printed so as to underlap the clear layer by 1 mm all round (i.e. fall short of the extent of the clear layer by 1 mm) and photopolymerised as in Example 1.

The following photopolymerisable pressure sensitive adhesive was overprinted using the same stencil as used for the clear layer and photopolymerised as in Example 1.

| Ingredients | Parts |
|---|---|
| Acrylated urethane prepolymer | 33 |
| Mellitic anhydride-diethyleneglycol polyester | 23 |
| 2-Phenoxyethyl acrylate | 16 |
| Tripropylene glycol diacrylate | 19 |
| Benzophenone | 4 |
| Benzil dimethyl ketal | 4 |
| | 100 |

The mellitic anhydride-diethylene glycol polyester is a solid saturated polyester with high acid value which is dissolved in the liquid monomers and a little 2-butoxyethanol solvent is added to adjust viscosity. The adhesive photopolymerises to a layer with a pressure sensitive adhesive surface and light stylus action causes transfer of all the layers simultaneously and the colour design has good colour contrast even on dark receiving surfaces.

EXAMPLE 7

The photopolymerisable litho inks of Example 5 can be replaced by the following conventional litho inks which dry by oxidation and after these inks are thoroughly dry the photopolymerisable clear screen ink of Example 5 is overprinted and photopolymerised as in Example 5.

| Yellow | |
|---|---|
| Ingredients | Parts |
| Colour Index Pigment Yellow 13 | 14 |
| Long oil linseed alkyd | 35 |
| Phenolic modified wood oil alkyd | 35 |
| Distillate b.pt. 225-266° C. | 13.5 |
| 12% cobalt octoate (drier) | 1 |
| 10% manganese siccatol (drier) | 1 |
| Methyl ethyl ketoxime (antioxidant) | 0.5 |
| | 100.0 |

The yellow pigment was dispersed in the long oil linseed alkyd on a hydraulic triple roll mill to a value of 6 on a Hegman gauge. The ink was finally thinned with 15-20% of distillate to give an ink viscosity of 15 poises.

Magneta

This was prepared similarly by replacing the yellow pigment with 18 parts of Colour Index Pigment Red 57.

Cyan

This was prepared in the same manner as the yellow ink by replacing the yellow pigment with 16 parts of Colour Index Pigment Blue 15.

Black

Carbon black 18 parts, toned with one part of Colour Index Pigment Blue 15 was used as the pigment in place of the yellow pigment in the above formulation to produce a black ink.

BRIEF DESCRIPTION OF THE DRAWING

The use of the transfers according to the invention is illustrated by the accompanying drawings in which:

FIG. 2 is a similar section through a second embodiment of transfer sheet;

FIG. 4 is a magnified view of the embodiment of FIG. 1 showing the effect of pulling the carrier sheet around a small diameter rod.

Referring to FIG. 1, a carrier sheet 1 is printed with a plurality of designs 2 (only one of which is shown). Because the design layer is pre-stressed (by shrinkage during photopolymerisation of the photopolymerised ink and/or by shrinkage during drying or curing of the non-photopolymerised ink component), the bond 3 between the carrier sheet 1 and the design 2 is already weakened. Thus release of the design layer on application of an external force is facilitated since a smaller disrupting force is necessary than would otherwise be required to break the bond.

FIG. 2 shows a similar transfer to that shown in FIG. 1, the difference being that the design layer consists of a stress-resisting photopolymerised white backing layer 2 which increases the contrast of the half-tone colour dots 4 on coloured receiving substrates. The colour dots were applied to the carrier sheet prior to the layer 2.

FIG. 3 shows a modification of the transfer shown in FIG. 1 and the mechanism of release. A photopolymerised ink design layer 2 is printed onto a carrier sheet 1. The difference between this embodiment and that shown in FIG. 1 is that the embodiment includes an adhesive layer 3 which overlaps the edges of the design layer 2. Release of the design layer may be achieved by application of local pressure 6 to the back of the carrier in the region of the design with a stylus 7. Because of pre-stressing of the design layer 2, the adhesive bond at 8 is weakened before application of the external force and the release initiated by the stylus pressure extends over a wider area than the stylus tip diameter. Air has entered at 9 between the design layer and the carrier sheet.

FIG. 4 illustrates the manner in which a design layer of the kind shown in FIG. 1 could be released from a carrier sheet. The carrier sheet 1 is conducted around a small radius rod 7. In order that release can be achieved in this way, a design layer of considerable thickness and high Young's modulus would be required so that it would resist the bonding force 6 applied by conducting the sheet around rod 7.

Figure 1:
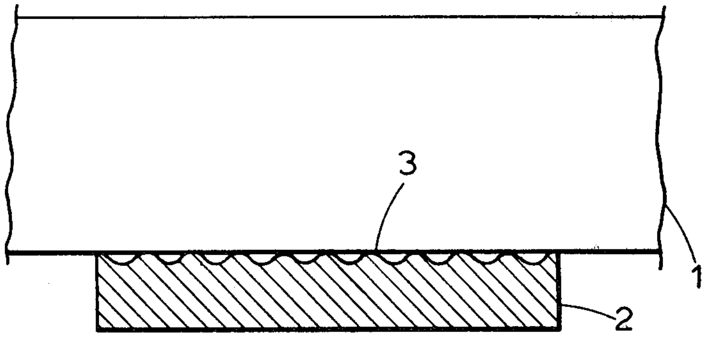
FIG. 1 is magnified section through one embodiment of transfer sheet.
Figure 3:
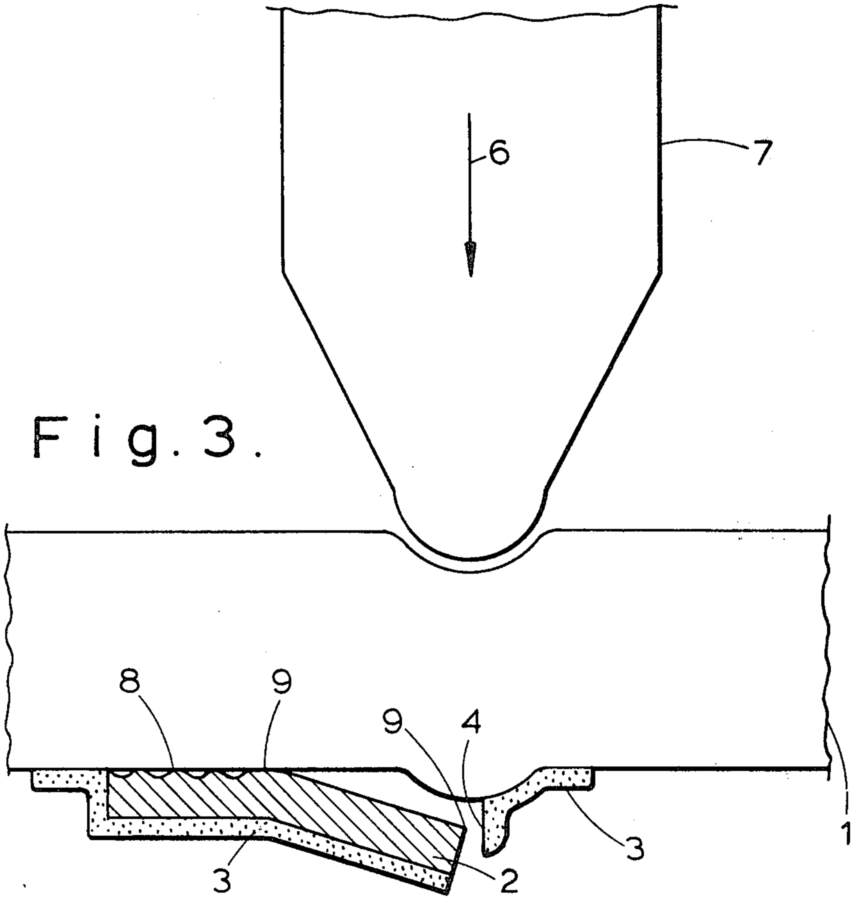
FIG. 3 is magnified sectional view of a third embodiment showing the release of the design on application of stylus pressure to the carrier sheet.

We claim:

1. A dry release transfer which comprises:

(a) a flexible light-transmitting carrier sheet, (b) a design layer releasably adhered thereto, said design layer comprising a flexible solid cross-linked polymer produced by photopolymerisation of a viscous liquid ink containing not more than 20% of volatile solvent printed on the carrier sheet, (c) said ink prior to photopolymerisation consisting essentially of one or more ethylenically unsaturated monomers and prepolymers containing pendant or terminal acryloyl or methacryloyl groups, (d) said photopolymerisation having been effected by exposure of the entire liquid ink layer to actinic radiation, whereby the liquid layer is rapidly converted to a flexible cross-linked solid design layer, said design layer possessing stress-resisting properties which resist deformation by a mechanical disrupting force, such as a stylus, applied to the carrier sheet and enables the design layer to be released from the carrier sheet and enables the design layer to be released from the carrier sheet without fracturing the design layer.

2. A transfer according to claim 1 wherein the liquid ink contains a photopolymerisable monomer component which contains about 2 acryloyl groups per molecule.

3. A transfer according to claim 1 in which said liquid ink contains a photoinitiator and is photopolymerised by exposure to ultra-violet light.

4. A transfer according to claim 1 wherein the liquid ink is photopolymerised by exposure to electron beam radiation.

5. A transfer according to claim 1 wherein the design layer is from 8 to 50 micrometers thick.

6. A transfer according to claim 1 wherein the design layer is pre-stressed by chemical treatment of the design layer after photopolymerisation.

7. A transfer according to claim 1 wherein the design layer bears a superficial layer of pressure-sensitive adhesive.

8. A transfer according to claim 1 wherein the ink includes a prepolymer which is an acrylated or methacrylated urethane prepolymer which contains about 2 to 6 acryloyl or methacryloyl groups per molecule.

9. A transfer according to claim 1 wherein the ink contains a monomer which is a mono- or poly acrylate ester.

10. A transfer according to claim 1 wherein the density of cross-linking in the photopolymerised design layer is such that the design layer undergoes shrinkage of from about 0.5 to 12% during exposure to actinic radiation, thereby causing physical pre-stressing of adhesive bonds between the design layer and the carrier sheet and enabling the design layer to be released more readily by application of stylus pressure to the carrier sheet in the region of the design.

11. A transfer according to claim 1 wherein the photopolymerisable, ethylenically unsaturated material is a blend of monomer and prepolymer, wherein a substantial proportion of the monomer has about 2 acryloyl groups per molecule and the prepolymer has about 2 to 6 acryloyl groups per molecule, whereby on photopolymerisation a cross-linked and flexible design layer is rapidly produced.

12. A transfer according to claim 11 wherein the flexible design layer in the region adjacent to the carrier substrate possesses the most highly polymerised part of the design layer.

13. A transfer according to claim 1 wherein the design layer consists of a plurality of layers including a cross-linked, photopolymerised layer.

14. A transfer according to claim 13 wherein all of the individual layers making up the design layer are photopolymerised.

15. A transfer according to claim 1 in which the design layer is coloured by pigments or dyes which do not inhibit fast photopolymerisation when exposed to actinic radiation.

16. A transfer according to claim 15 wherein the design layer contains a white pigment selected from zinc sulfide and barium sulfate and mixtures thereof.

17. A transfer according to claim 1 wherein the design layer is pre-stressed by latent shrinkage of the printed ink layer during photopolymerisation, said shrinkage being resisted by the carrier sheet whereby adhesive bonds between the design layer and the carrier sheet are in a state of strain.

18. A transfer according to claim 17 wherein the latent shrinkage of the ink layer arises by cross-linking during the photopolymerisation.

19. A transfer according to claim 1 wherein the photopolymerisable ink comprises a blend of a high viscosity liquid or solid photopolymerisable prepolymer and a low viscosity liquid monomer or low molecular weight prepolymer.

20. A transfer according to claim 19 wherein the high viscosity liquid or solid prepolymer is an acrylated urethane prepolymer having a molecular weight of between 250 and 5000.

21. A transfer according to claim 19 in which the low viscosity liquid monomer or prepolymer is an ester of acrylic or methacrylic acid and a mono- or poly hydric alcohol.

* * * * *